United States Patent [19]
Kakizaki et al.

[11] Patent Number: 5,091,810
[45] Date of Patent: Feb. 25, 1992

[54] FLOATING TYPE MAGNETIC HEAD HAVING HEAD CORE AFFIXED TO OUTSIDE SURFACE OF SLIDER

[75] Inventors: Masao Kakizaki; Yoshihito Kobayashi, both of Yamanashi; Hiroshi Yagi, Ichikawa, all of Japan

[73] Assignee: TDK Corporation, Tokyo, Japan

[21] Appl. No.: 528,494

[22] Filed: May 25, 1990

[30] Foreign Application Priority Data

Jun. 29, 1989 [JP] Japan .................................. 1-168033

[51] Int. Cl.$^5$ ....................... G11B 5/48; G11B 21/16
[52] U.S. Cl. ..................................... 360/103; 360/104
[58] Field of Search ......................... 360/102, 103, 104

[56] References Cited

U.S. PATENT DOCUMENTS

| | | | |
|---|---|---|---|
| 4,669,011 | 5/1987 | Lemke | 360/103 |
| 4,779,154 | 10/1988 | Kakuno et al. | 360/103 |
| 4,870,520 | 9/1989 | Shaw | 360/103 |
| 4,945,434 | 7/1990 | Wilmer et al. | 360/103 |
| 4,972,279 | 11/1990 | Atesmen et al. | 360/103 |

FOREIGN PATENT DOCUMENTS 61-51615  3/1986  Japan .................................. 360/103

Primary Examiner—John H. Wolff
Attorney, Agent, or Firm—Oblon, Spivak, McClelland, Maier & Neustadt

[57] ABSTRACT

This invention provides a floating type magnetic head comprising a slider which has at least two rail-like floating parts, and a head core attached on a side of the slider. The magnetic head is characterized in that the head core is attached to the slider in a manner a window thereof for wiring protrudes from the rear end of the slider or the slider end facing downstream in the advancing direction of a magnetic recording medium or a side of the slider adjacent to the window is partially cut out on the rear end thereof. Such structure simplifies winding operation. Another feature of this invention magnetic head lies in that the magnetic gap of the head core is positioned at outermost location of the head to thereby increase recording capacity on a recording medium.

12 Claims, 6 Drawing Sheets

FLOATING TYPE MAGNETIC HEAD HAVING HEAD CORE AFFIXED TO OUTSIDE SURFACE OF SLIDER

BACKGROUND OF THE INVENTION

1. Field of the Invention

This invention relates to a floating type magnetic head and more particularly, to a floating type composite magnetic head which is used for data recording/reproduction of computer hard discs.

2. Discussion of the Background

The prior art floating composite head of this type comprises two to three rail like projections on a surface of a slider facing a disc in order to float the head with respect to the magnetic disc at the time of recording/reproduction, a recess in the form of a letter U at the tip end of said slider in a manner to penetrate through the sides, and a core groove formed on an end of the slider in a manner to intersect said recess so that a head core is inserted into said core groove straddling over said recess, and then a wire is wound about the core side via said recess.

FIG. 7 is a perspective view to show a prior art composite head for computers which comprises a rectangular block-like slider 1 extending in the running direction of the magnetic disc, two to three raised rails 2, 3 provided on the slider surface facing the disc, and a recess 4 formed at the tip end of the slider 1 in the longitudinal direction extending through the sides of the slider. A groove 8 is formed along the running direction of the disc at the tip end of the slider 1 in one of the rails 2. A head core 5 is inserted into the groove, and an interstice between the groove 8 and the core 5 is filled with fused glass. In the figure the numeral 7 denotes the magnetic gap of the head core 5 exposed on the rail surface of the slider 1. The head core 5 is embedded in the groove 8 in a manner that one core side 6 straddles over said U-shaped recess 4, and after the surrounding space thereof is filled with fused glass for fixing the same, wire 9 is wound around the core side 6 through the recess 4.

The prior art composite head mentioned above is defective in that as the head core is fixed in the groove of the slider with fused glass or the like, wiring should wait until the core is fixed with the slider, requiring cumbersome procedures in manufacture. Especially, when the slider is of a small size, the recess at an end thereof through which a wire should be inserted is very narrow, making the wiring operation extremely difficult and sometimes causing accidental damages to the surrounding walls of the recess or sides of the core. The wiring operation posed a bottleneck for higher yield and mass production in the prior art.

Moreover, as the core groove at an end of the slider of the conventional composite head is positioned substantially at the center of the width of a raised rail, the position of the magnetic gap is inevitably at the center of the width of the rail or in other words, at a position considerably inward from the outermost side of the rail, thereby wasting recording area of the magnetic disc close to the center and outer periphery thereof.

SUMMARY OF THE INVENTION

In view of the foregoing, this invention aims to provide a floating type composite head which is easy in assembling, large in packing capacity, low in production cost and suitable for mass production by attaching the head core on the outer side of the slider rather than embedding the same in a groove at an end of the slider.

The above object of the present invention may be achieved by a floating type magnetic head which comprises a slider having rail-like floating sections and a head core attached on one side of said slider. Said head core is attached to a side of said slider in a manner that a window portion of the head core protrudes from an end of said slider toward downstream of the running direction of magnetic recording medium.

According to one mode of this invention, the floating type magnetic head includes a slider having rail-like floating sections and a head core attached to one side of said slider, wherein said head core is attached to one side of said slider in a manner that a magnetic gap section of said head core intersects an extension of the outermost edge line of the whole head surface facing a magnetic recording medium.

BRIEF DESCRIPTION OF THE DRAWINGS

The foregoing and other objects, features and advantages of the invention will be apparent from the following more particular description of the preferred embodiments of the invention illustrated in the accompanying drawings, wherein.

DESCRIPTION OF THE PREFERRED EMBODIMENTS

Figure 1:
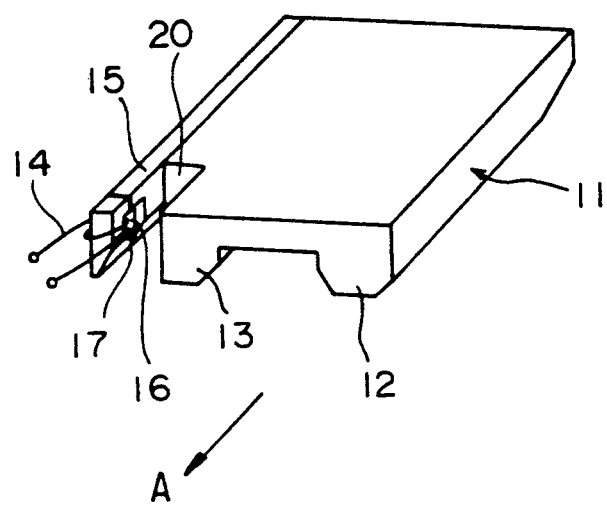
FIG. 1 is a perspective view to show the first embodiment of the floating type magnetic head according to this invention.

Referring now to the first embodiment shown in FIG. 1, a floating type head comprises a pair of rails 12, 13 projecting from a slider surface facing a magnetic disc, and a head core 15 pasted on one side of the slider by means of glass or resin. In this embodiment, the head core 15 extends substantially along the whole length of the side of the slider 11, and for convenience of winding a wire 14, a portion of the slider adjacent to a window 16 for the wire 14 is squarely removed as shown with the numeral 20 in advance so that the wire 14 which is wound 16 after the core is pasted on the slider would not touch the sides of the slider.

Figure 5:
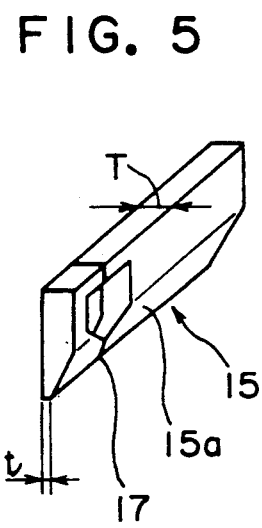
FIGS. 5 and 6 are perspective views to show different types of the head core applicable to this invention respectively.
Figure 6:
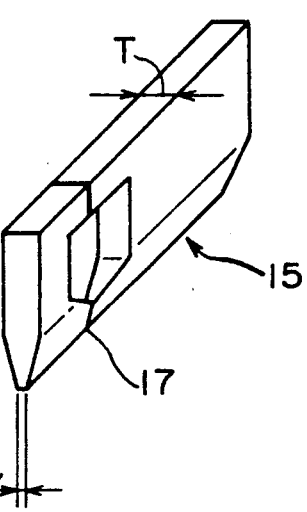
Figure 7:
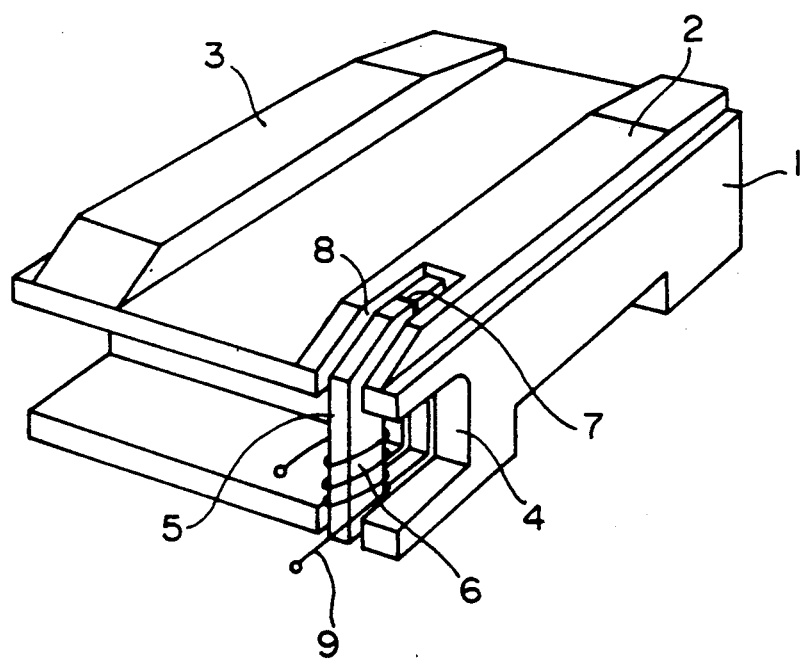
FIG. 7 is a perspective view to show a conventional floating type composite head.

The shape of the head core 15 may be as shown in FIG. 5 wherein the head core is tapered on the side 15a opposite the slider (or the outer side) so as to make the side which slides against the magnetic disc narrower, or may be as shown in FIG. 6, the both sides of the core are tapered to reduce, so that the thickness t of the core on the side that slides against the disc may become ca. $60\mu$ if the thickness T of the core 15 is $100$–$120\mu$. A magnetic gap 17 is formed in a manner to pass across the narrow width of the core. This narrow magnetic gap portion defines the width of the recording/reproducing track of the disc.

Figure 2:
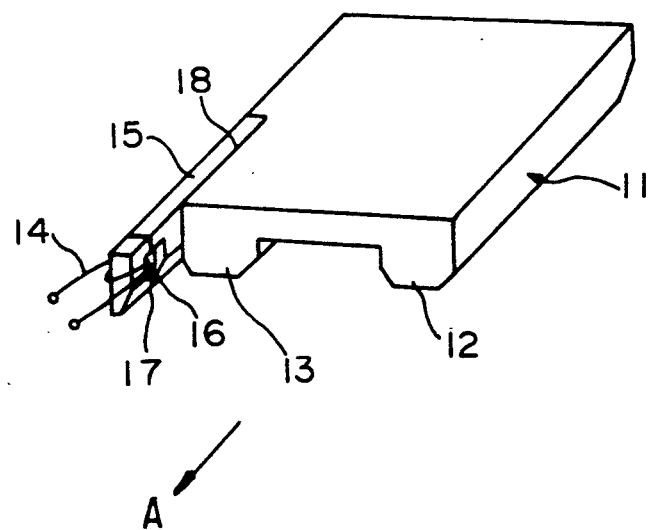
FIG. 2 is a perspective view to show the second embodiment of the floating type magnetic head according to this invention.

In the second embodiment shown in FIG. 2, the slider 11 is partially cut out on the outside thereof in a square, and the head core 15 is pasted on the side of the cut-out in a manner to protrude the magnetic gap 17 and the core window 16 from the downstream end of the slider in the running direction of the disc. (The running direction of the disc is indicated by arrow A in the Figures.) In the FIG. 2 embodiment, the magnetic gap 17 is formed at the far outer side of the rail compared to the conventional head core which is embedded in a groove at an end of a slider. As the head core 15 is pasted on the outer most side of the rail of the slider 11, the positional precision of the magnetic gap in respect of the slider 11 can be enhanced. In this embodiment, the core 15 is wired after it is attached on the slider 11. Wiring becomes easier than the prior art because the core window is not hidden within the U-shaped recess of the slider.

Figure 3:
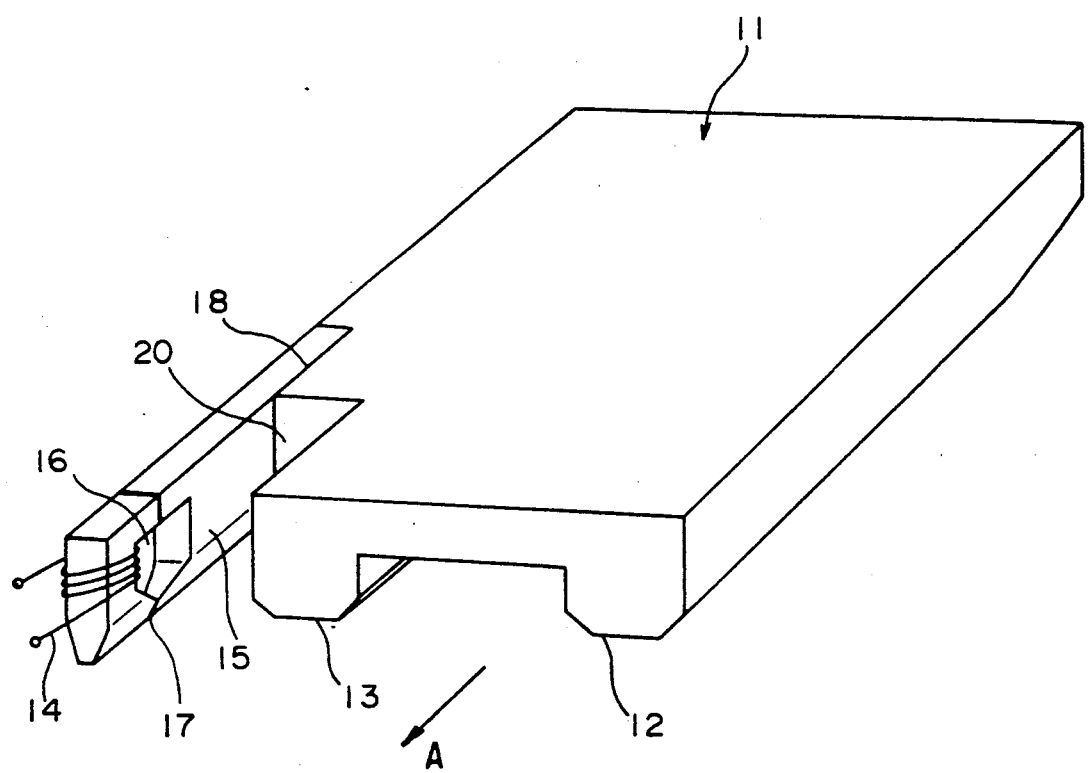
FIG. 3 is a perspective view to show the third embodiment of this invention floating type magnetic head having two-stepped sections.

Referring now to FIG. 3, the third embodiment slider 11 is cut out further by one more step in addition to the cut-out 20 shown in FIG. 1. A head core 15 is pasted against the outer cut-out 18 of the slider. In short, the slider is cut out in two steps on one side thereof to form two cut-outs 18, 20. The window 16 of the head core 15 projects from the slider end, but the head core as a whole is shorter than the first and second embodiments in the disc running direction, and smaller in size. As this reduces impedance, it can achieve high packing density with high frequency current.

Figure 4A:
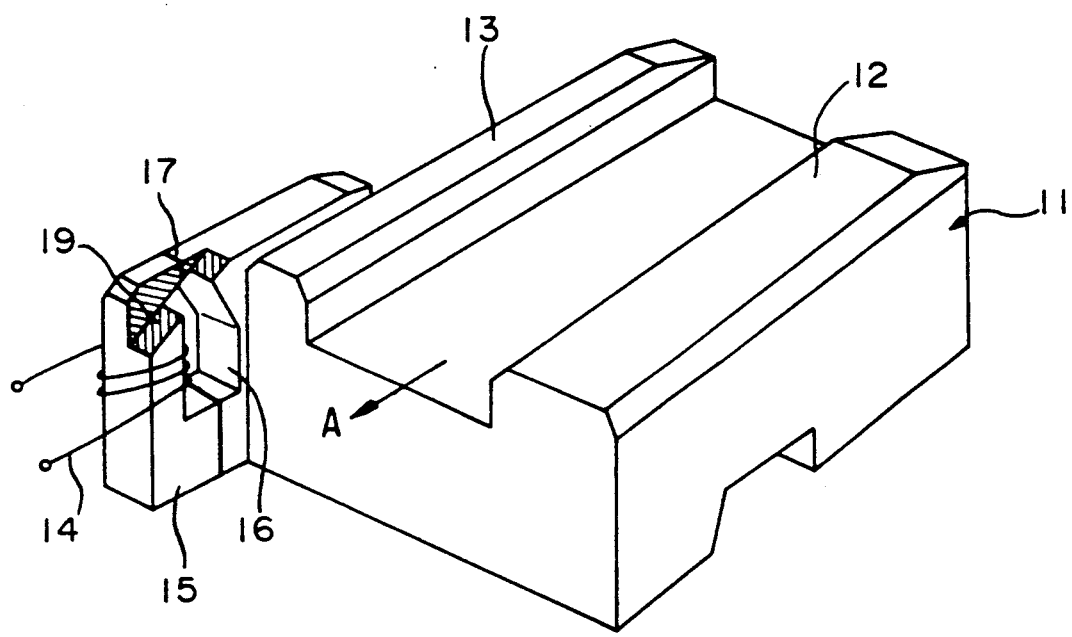
FIGS. 4A and 4B are perspective views to show a modification of the embodiment of the floating type magnetic head shown in FIG. 2 viewed from the sliding surface.
Figure 4B:
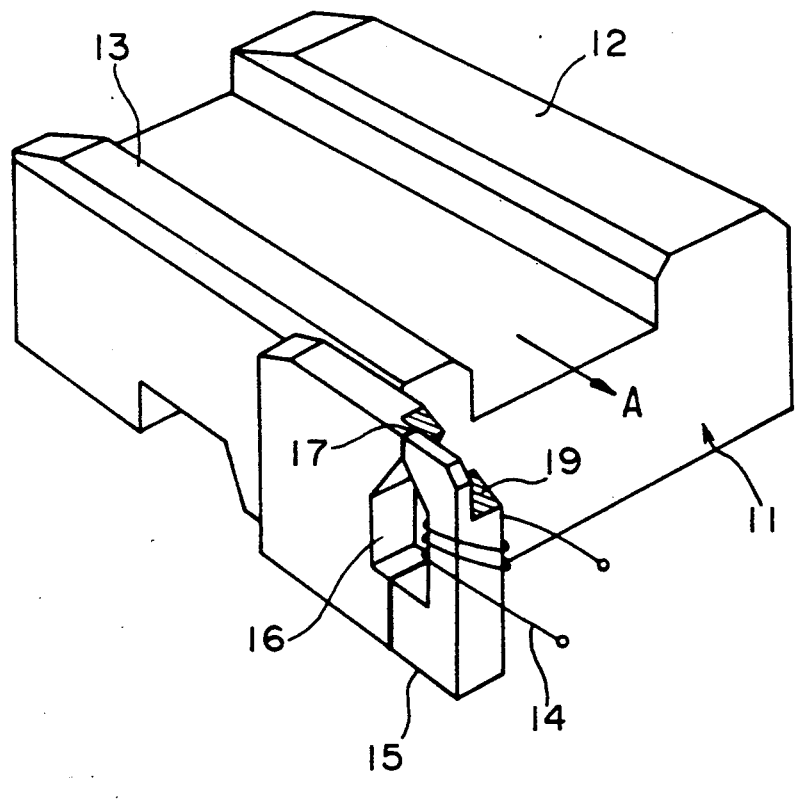

In a modified embodiment shown in FIGS. 4A and 4B, the head core is cut away obliquely on the inner side facing the disc from the position near the end of the slider toward the core front end downstream of the disc running direction as shown by the numeral 19 to make the surface that slides against the disc narrower toward the outside (ca 60μin width). The magnetic gap 17 is formed to intersect this narrow sliding surface. When viewed from the sliding surface of the outer rail 13 of the slider 11, the magnetic gap 17 is formed on the outermost side of the slider. Therefore, when recording/reproduction on a magnetic disc with the composite head like this, tracks may be formed from the outermost periphery of the disc as the head can be brought to the outermost peripheral side of the disc. When the head stroke is the same, the diameter of the track at the end of the stroke on the inner side of the disc becomes larger to shorten the recording wavelength as well as to increase frequency to increase recording line density thereby increasing the recording capacity as a whole. In the modified embodiment shown in FIGS. 4A and 4B, the slider 11 is not cut away on the side thereof like the aforementioned embodiments. The head core 15 is directly pasted on a flat side of the slider 11. As the side of the slider is flat along the length, surface precision is easily enhanced thereon. Moreover, this allows the position of the magnetic gap 17 to be further outward of the head. In the embodiment shown in FIG. 3, however, the head core 15 may be easily positioned on the slider as the core 15 is attached to the cut-out 18. After the head core 15 is adhered to the side with resin or glass, the stepped portions of the head surface sliding against the disc is finished by lapping.

As stated above, this invention makes assembly operation of a head extremely simpler because the head core is wired in advance, and then pasted on the outer side of the slider. Positional alignment of the core is also made easier, and mass producibility and production yield higher. Even after the core is pasted, the sliding surface may be processed or finished. As resin adhesive is used for pasting the core, the cost may be cut down. As this invention head can be assembled with a smaller number of processing steps, and as the magnetic gap may be formed on the outermost side of the slider, recording or reproducing is possible to the outermost periphery of the magnetic disc to thereby increase recording capacity as well as to achieve various other effects.

What is claimed is:

1. A floating type magnetic head for recording onto a magnetic medium travelling in a running direction, said magnetic head comprising:
    a slider having rail like floating portions; and
    a head core having a magnetic gap and a wiring window, said head core being attached to one side of the slider in a manner such that said magnetic gap in combination with said window protrudes beyond said rail like floating portions in a direction perpendicular to the running direction of the magnetic recording medium.

2. The floating type magnetic head as claimed in claim 1 wherein said slider is partially cut out on a side adjacent to the head core and downstream of the magnetic recording medium in said running direction.

3. The floating type magnetic head as claimed in claim 1 or 2 wherein said head core is attached to said slider in such a manner that said magnetic gap intersects the extension of the outermost ridge of the magnetic head surface which faces the recording medium.

4. The floating type magnetic head as claimed in claim 1 wherein said head core includes said wiring window for receiving windings of wire around the head core, and wherein said head core is attached to said slider in such a manner that at least a portion of the wiring window projects downstream of the slider in the running direction of the recording medium.

5. The floating type magnetic head as claimed in claim 1, wherein each of said rail like floating portions has a longitudinal axis extending in the running direction of the recording medium.

6. The floating type magnetic head as claimed in claim 1, wherein said magnetic head core has a longitudinal axis arranged parallel to said rail like floating portions, and wherein said magnetic head core extends farther than said rail like floating portions in the running direction of the recording medium.

7. The floating type magnetic head as claimed in claim 1, wherein the head core has a portion of the thickness forming a track width of the recording medium, and wherein said portion of the thickness is cut away obliquely toward a downstream end of the head core to provide a narrowed surface for sliding along the recording medium.

8. The floating type magnetic head as claimed in claim 1, wherein said head core is pasted on an outside surface of the slider with glass or resin.

9. The floating type magnetic head as claimed in claim 8, wherein a single notch is provided in said outside surface of the slider, and wherein the magnetic head core is received in the notch.

10. The floating type magnetic head as claimed in claim 8, wherein a stepped notch is provided in said outside surface of the slider, and wherein the magnetic head core is received in an outermost step of the stepped notch.

11. The floating type magnetic head as claimed in claim 1, wherein the head core has a thickness perpendicular to the running direction of the recording medium, and wherein at least one wall of said head core is tapered to provide a reduced thickness for sliding along the recording medium.

12. The floating type magnetic head as claimed in claim 1, wherein said slider includes two rail like floating portions.

* * * * *